(12) United States Patent
Shimizu et al.

(10) Patent No.: US 9,339,758 B2
(45) Date of Patent: May 17, 2016

(54) GAS BARRIER RESIN COMPOSITION AND GAS BARRIER COMPOSITE FILM

(71) Applicant: MITSUI CHEMICALS TOHCELLO, Inc., Chiyoda (JP)

(72) Inventors: Masaru Shimizu, Utsunomiya (JP); Daisuke Matoba, Koga (JP)

(73) Assignee: MITSUI CHEMICALS TOHCELLO, INC., Tokyo (JP)

( * ) Notice: Subject to any disclaimer, the term of this patent is extended or adjusted under 35 U.S.C. 154(b) by 39 days.

(21) Appl. No.: 14/365,448

(22) PCT Filed: Dec. 13, 2012

(86) PCT No.: PCT/JP2012/082380
§ 371 (c)(1),
(2) Date: Jun. 13, 2014

(87) PCT Pub. No.: WO2013/089192
PCT Pub. Date: Jun. 20, 2013

(65) Prior Publication Data
US 2014/0373716 A1 Dec. 25, 2014

(30) Foreign Application Priority Data

Dec. 16, 2011 (JP) ................................ 2011-276109
Dec. 16, 2011 (JP) ................................ 2011-276110
Dec. 20, 2011 (JP) ................................ 2011-278866
Dec. 20, 2011 (JP) ................................ 2011-278867
Dec. 28, 2011 (JP) ................................ 2011-288976

(51) Int. Cl.
| | |
|---|---|
| B01D 53/22 | (2006.01) |
| C08L 67/00 | (2006.01) |
| C08L 33/00 | (2006.01) |
| B01D 71/62 | (2006.01) |
| B01D 69/12 | (2006.01) |
| C08L 33/08 | (2006.01) |
| C08L 67/02 | (2006.01) |
| B32B 27/32 | (2006.01) |

(52) U.S. Cl.
CPC .............. *B01D 53/228* (2013.01); *B01D 69/12* (2013.01); *B01D 71/62* (2013.01); *B32B 27/32* (2013.01); *C08L 33/00* (2013.01); *C08L 33/08* (2013.01); *C08L 67/00* (2013.01); *C08L 67/02* (2013.01); *B32B 2255/10* (2013.01); *B32B 2255/20* (2013.01); *B32B 2255/205* (2013.01); *B32B 2307/7242* (2013.01); *C08L 2201/10* (2013.01); *C08L 2201/14* (2013.01); *C08L 2205/03* (2013.01)

(58) Field of Classification Search
CPC ...... B01D 53/228; B01D 69/12; B01D 71/62; B32B 27/06; B32B 27/30; B32B 27/32; B32B 27/36; B32B 9/00; B32B 2255/10; B32B 2250/20; B32B 2255/205; B32B 2307/7242; C08L 32/02; C08L 33/00; C08L 67/00; C08L 67/02; C08L 2201/10; C08L 2201/14; C08L 2205/03
USPC ........................................ 96/13; 524/516, 502
See application file for complete search history.

(56) References Cited

U.S. PATENT DOCUMENTS

| | | | |
|---|---|---|---|
| 7,166,353 B2 | 1/2007 | Yoshida et al. | |
| 7,288,315 B2 | 10/2007 | Yoshida et al. | |
| 7,910,213 B2 | 3/2011 | Yoshida et al. | |
| 8,124,236 B2 | 2/2012 | Okawara et al. | |
| 2001/0016260 A1* | 8/2001 | Yoshida .................. | C08L 67/00 428/425.8 |
| 2006/0073317 A1* | 4/2006 | Sato ........................ | B32B 27/36 428/212 |
| 2007/0059541 A1* | 3/2007 | Yoshida .................. | B32B 27/36 428/475.2 |
| 2010/0035050 A1* | 2/2010 | Okawara ................. | B32B 27/00 428/336 |
| 2011/0129654 A1* | 6/2011 | Yoshida .................. | B32B 27/08 428/201 |
| 2013/0029045 A1* | 1/2013 | Koganehira .......... | C09D 137/00 524/386 |
| 2013/0260143 A1* | 10/2013 | Oomori .................... | C08L 1/00 428/336 |
| 2013/0260144 A1* | 10/2013 | Yamazaki ............. | B32B 27/308 428/336 |

FOREIGN PATENT DOCUMENTS

| | | |
|---|---|---|
| JP | 44-7134 Y1 | 3/1969 |
| JP | 45-22011 Y1 | 9/1970 |
| JP | 48-78233 U | 9/1973 |
| JP | 50-58123 U | 5/1975 |
| JP | 2001-10003 A | 1/2001 |
| JP | 2003-320610 A | 11/2003 |

(Continued)

OTHER PUBLICATIONS

International Search Report (PCT/ISA/210) mailed on Feb. 12, 2013, by the Japanese Patent Office as the International Searching Authority for International Application No. PCT/JP2012/082380.

*Primary Examiner* — Jason M Greene
(74) *Attorney, Agent, or Firm* — Buchanan, Ingersoll & Rooney, PC

(57) ABSTRACT

Provided are a gas barrier resin composition, and a gas barrier composite film excellent in gas barrier properties with respect to oxygen, carbon dioxide gas, water vapor or the like, particularly in gas barrier properties even after hot water treatment. The gas barrier resin composition includes an oxazoline group-containing aqueous polymer (A), an aqueous acrylic resin (B) and/or an aqueous polyester resin (C) each at a specific concentration, wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)], is within the specific range. The gas barrier composite film uses this composition.

6 Claims, No Drawings

(56) References Cited

FOREIGN PATENT DOCUMENTS

| JP | 2006-68967 A | 3/2006 |
| JP | 3881463 B2 | 11/2006 |
| JP | 2007-30341 | * 2/2007 ............. B32B 27/00 |
| JP | 2007-30341 A | 2/2007 |
| JP | 2008-88404 A | 4/2008 |
| JP | 2011-224981 A | 11/2011 |

* cited by examiner

GAS BARRIER RESIN COMPOSITION AND GAS BARRIER COMPOSITE FILM

TECHNICAL FIELD

The present invention relates to a gas barrier resin composition having an oxazoline group and a carboxyl group in a specific amount at a specific ratio, and a gas barrier composite film comprising a layer of a cured product of said gas barrier resin composition (hereinafter, also referred to as the "cured product layer") that is provided between a base material layer and an inorganic thin film layer. The gas barrier composite film has superior barrier properties with regard to e.g., oxygen, water vapor, even after hot water treatment including retort treatment and also has transparency.

BACKGROUND ART

As barrier materials with regard to oxygen, water vapor and the like, attraction has been focused on a gas barrier film obtained by forming, on a film base material, a metal and/or a metal oxide such as aluminum, aluminum oxide or silicon oxide, by a method such as vacuum deposition, sputtering, ion plating or chemical vapor deposition (CVD method). Such a gas barrier film is generally obtained by depositing an inorganic thin film on a surface of a base material composed of a biaxially-stretched polyester film excellent in transparency and rigidity. When such a film is used as it is, the deposited layer is susceptible to rubbing in use, and its use as a packaging film may involve the cracking of the inorganic thin film as a result of friction or elongation at the time of post-treatments including printing and laminating or at the time of incorporating contents, leading to the reduction of gas barrier properties. After hot water treatment such as boil treatment and retort treatment, partial delamination may be induced between the base material and the inorganic thin film, so that characteristics of the deposition film, such as gas barrier properties, may be significantly lowered.

Conventionally, in order to prevent the reduction of gas barrier properties, a method has been known in which between a polyester film serving as a base material of a deposition film and a deposited film, an under coat layer (primary layer) is provided which is, for example, any of various polyesters, polyurethane and acryls (For example, Patent Literature 1). Further, in order to prevent the reduction of gas barrier properties after hot water treatment, a coating layer containing any of a special acryl, polyurethane and polyester has been proposed (Patent Literature 2).

However, it is difficult for many of the deposition films described above to retain water resistance under high temperature (hot water resistance), in particular gas barrier properties after retort treatment. Retort-treating these films, for example, under retort treatment temperature condition of 135° C. would significantly lower their gas barrier properties. Thus, deposition films with gas barrier properties that would not be reduced even after treatment have been demanded.

CITATION LIST

Patent Literature

[Patent Literature 1] JP-A-2001-10003
[Patent Literature 2] JP-B-3881463

SUMMARY OF THE INVENTION

Technical Problem

It is an object of the present invention to provide a gas barrier resin composition comprising two or more kinds of polymers, each component having an oxazoline group or a carboxyl group at a specific range, wherein the mole number ratio between these groups is within a specific ratio. It is another object of the present invention to provide a gas barrier composite film comprising a layer of a cured product of the gas barrier resin composition that is provided between a base material layer and an inorganic thin film layer, wherein the gas barrier composite film, even after hot water treatment such as retort treatment, has superior gas barrier properties with respect to oxygen, water vapor and the like and has transparency.

Technical Solution

Embodiment (i)

According to an embodiment (i) of the present invention, a gas barrier resin composition is provided which comprises 5 to 55 wt % of an oxazoline group-containing aqueous polymer (A) containing 6.0 to 9.0 mmol/g of an oxazoline group, and 95 to 45 wt % of an aqueous acrylic resin (B) containing 0.5 to 3.5 mmol/g of a carboxyl group (the total amount of the oxazoline group-containing aqueous polymer (A) and the aqueous acrylic resin (B) is 100 wt %), wherein the ratio of the mole number of the oxazoline group to the mole number of the carboxyl group [the ratio of the mole number of the oxazoline group (x mmol) to the mole number of the carboxyl group (y mmol), (x/y), which is indicated in terms of percentage as (x/y)×100 (mol %)], is 100 to 420 mol %.

Embodiment (ii)

Further, according to an embodiment (ii) of the present invention, a gas barrier resin composition is provided which comprises 5 to 55 wt % of an oxazoline group-containing aqueous polymer (A) containing 6.0 to 9.0 mmol/g of an oxazoline group, and 95 to 45 wt % of an aqueous polyester resin (C) containing 0.5 to 2.0 mmol/g of a carboxyl group (the total amount of the oxazoline group-containing aqueous polymer (A) and the aqueous polyester resin (C) is 100 wt %), wherein the ratio of the mole number of the oxazoline group to the mole number of the carboxyl group [the ratio of the mole number of the oxazoline group (x mmol) to the mole number of the carboxyl group (y mmol), (x/y), which is indicated in terms of percentage as (x/y)×100 (mol %)], is 65 to 420 mol %.

Embodiment (iii)

Further, according to an embodiment (iii) of the present invention, a gas barrier resin composition is provided which comprises 10 to 55 wt % of an oxazoline group-containing aqueous polymer (A) containing 6.0 to 9.0 mmol/g of an oxazoline group, 10 to 80 wt % of an aqueous acrylic resin (B) containing 0.5 to 3.5 mmol/g of a carboxyl group, and 10 to 80 wt % of an aqueous polyester resin (C) containing 0.5 to 2.0 mmol/g of a carboxyl group (the total amount of the oxazoline group-containing aqueous polymer (A), the aqueous acrylic resin (B) and the aqueous polyester resin (C) is 100 wt %), wherein the ratio of the mole number of the oxazoline group to the mole number of the carboxyl group [the ratio of the mole number of the oxazoline group (x mmol) to the mole number of the carboxyl group (y mmol), which is indicated in terms of percentage as (x/y)×100 (mol %)] is 150 to 420 mol %.

Furthermore, following any of these embodiments of the present invention, a gas barrier composite film is provided which comprises a base material layer, a layer formed from a cured product of any of the above gas barrier resin compositions and an inorganic thin film layer in this order.

Advantageous Effects of the Invention

In the present invention, a gas barrier resin composition according to an embodiment (i) or (ii) comprises an oxazoline group-containing aqueous polymer (A), together with an aqueous acrylic resin (B) or an aqueous polyester resin (C), as essential components, each component having a specific amount of an oxazoline group or a carboxyl group, wherein the mole number ratio between these groups is within a specific range. A cured product of this composition has superior performance of improved gas barrier properties, and can be used for various applications. In particular, a composite film having a base material layer, a layer of the cured product of the gas barrier resin composition and an inorganic thin film layer has superior gas barrier properties with respect to oxygen, water vapor, carbon dioxide gas and the like, and has transparency.

In the present invention, a gas barrier resin composition according to an embodiment (iii) comprises an oxazoline group-containing aqueous polymer (A), an aqueous acrylic resin (B) and an aqueous polyester (C), as essential components, each component having a specific amount of an oxazoline group or a carboxyl group, wherein the mole number ratio between the groups is within a specific range. A cured product of this composition also has superior performance of improved gas barrier properties, and can be used for various applications. In particular, a composite film having a base material layer, a layer of the cured product of the gas barrier resin composition and an inorganic thin film layer has superior gas barrier properties with respect to oxygen, water vapor, carbon dioxide gas and the like, and has transparency.

In particular, packaging films and containers, for example, including laminates, e.g., films or sheets, that use the layer of the cured product of these gas barrier resin compositions, even after hot water treatment such as boil treatment and retort treatment, have excellent performance of suppressed decrease in their gas barrier properties.

DESCRIPTION OF EMBODIMENTS

Gas Barrier Resin Composition (System Requiring Two Polymer Components)
Embodiment (i)

According to an embodiment (i) of the gas barrier resin composition of the present invention, the composition comprises 5 to 55 wt % of an oxazoline group-containing aqueous polymer (A) containing 6.0 to 9.0 mmol/g of an oxazoline group, and 95 to 45 wt % of an aqueous acrylic resin (B) containing 0.5 to 3.5 mmol/g of a carboxyl group (the total amount of the oxazoline group-containing aqueous polymer (A) and the aqueous acrylic resin (B) is 100 wt %), wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)], is 100 to 420 mol %.

In this embodiment, the oxazoline group-containing aqueous polymer (A) and the aqueous acrylic resin (B) are essential polymer components, and other polymer components such as other resins are used in combination as needed.

In the oxazoline group-containing aqueous polymer (A), which is an essential polymer component, the content of the oxazoline group is 6.0 to 9.0 mmol/g, preferably 6.5 to 8.5 mmol/g, more preferably 7.0 to 8.0 mmol/g.

The oxazoline group-containing aqueous polymer (A) is incorporated in an amount of 5 to 55 wt %, preferably 10 to 50 wt %, more preferably 15 to 45 wt %, further preferably 25 to 40 wt % (the total amount of the oxazoline group-containing aqueous polymer (A) and the aqueous acrylic resin (B) is 100 wt %).

If the oxazoline group-containing aqueous polymer (A) is incorporated in an amount of less than 5 wt %, the crosslinking by an oxazoline group tends to be insufficient, and if the amount exceeds 55 wt %, a layer formed from a cured product of the gas barrier resin composition tends to have insufficient hot water resistance and solvent resistance. By controlling the amount within the range described above, a gas barrier composite film using a layer of a cured product of the gas barrier resin composition can have more stabilized gas barrier properties after hot water treatment.

On the other hand, in the aqueous acrylic resin (B), the content of the carboxyl group is 0.5 to 3.5 mmol/g, more preferably 0.8 to 3.5 mmol/g, still more particularly 1.0 to 3.5 mmol/g, further preferably 1.5 to 3.0 mmol/g, most preferably 2.0 to 3.0 mmol/g.

By controlling the amount within the range described above, a gas barrier composite film using a layer of a cured product of the gas barrier resin composition can have more stabilized gas barrier properties after hot water treatment.

In particular, as described later, in a composite film having a base material layer, a layer of a cured product of the gas barrier resin composition and an inorganic thin film layer in this order, when the inorganic thin film layer is a layer containing a metal, its oxide, nitride, oxynitride, fluorinated compound or the like of Group 4B elements, e.g., silicon, of the periodic table, the carboxyl group content in the aqueous acrylic resin (B) is preferably 0.5 to 3.5 mmol/g, more preferably 0.8 to 3.5 mmol/g, still more preferably 1.0 to 3.0 mmol/g, further preferably 1.5 to 3.0 mmol/g, most preferably 2.0 to 3.0 mmol/g.

On the other hand, as described later, in a composite film having a base material layer, a layer of a cured product of the gas barrier resin composition and an inorganic thin film layer in this order, when the inorganic thin film layer is a layer containing a metal, its oxide, nitride, fluorinated compound or the like of Group 2A elements, transition elements, Group 2B elements or Group 3B elements of the periodic table, the carboxyl group content in the aqueous acrylic resin (B) is preferably 1.5 to 3.5 mmol/g, more preferably 2.0 to 3.0 mmol/g.

In the embodiment (i), the aqueous acrylic resin (B) is incorporated in an amount of 95 to 45 wt %, preferably 90 to 50 wt %, more preferably 85 to 55 wt %, most preferably 75 to 60 wt % (the total amount of the oxazoline group-containing aqueous polymer (A) and the aqueous acrylic resin (B) is 100 wt %).

By controlling the amount within the range described above, a gas barrier composite film using a layer of a cured product of the gas barrier resin composition can have more stabilized gas barrier properties after hot water treatment.

In the gas barrier resin composition according to the embodiment (i), the ratio of the mole number of the oxazoline group to the mole number of the carboxyl group [ratio of the mole number of the oxazoline group (x mmol) to the mole number of the carboxyl group (y mmol), which is indicated as (x/y)×100 (mol %)] is 100 to 420 mol %, preferably 110 to 400 mol %, more preferably 115 to 300 mol %, most preferably 120 to 260 mol %.

In particular, as described later, in a composite film having a base material layer, a layer of a cured product of the gas barrier resin composition and an inorganic thin film layer in this order, when the inorganic thin film layer is a layer containing of a metal, its oxide, nitride, oxynitride, fluorinated compound or the like of Group 4B elements, e.g., silicon, of the periodic table, the mole number ratio is preferably 100 to 300 mol %, more preferably 110 to 280 mol %, most preferably 120 to 260 mol %.

On the other hand, as described later, in a composite film having a base material layer, a layer of a cured product of the gas barrier resin composition and an inorganic thin film layer in this order, when the inorganic thin film layer is a layer containing a metal, its oxide, nitride, fluorinated compound or the like of Group 2A elements, transition elements, Group 2B elements or Group 3B elements of the periodic table, the mole number ratio is preferably 150 to 420 mol %, more preferably 115 to 300 mol %, most preferably 120 to 260 mol %.

Embodiment (ii)

According to an embodiment (ii) of the gas barrier resin composition of the present invention, the composition comprises 5 to 55 wt % of an oxazoline group-containing aqueous polymer (A) containing 6.0 to 9.0 mmol/g of an oxazoline group, and 95 to 45 wt % of an aqueous polyester resin (C) containing 0.5 to 2.0 mmol/g of a carboxyl group (the total amount of the oxazoline group-containing aqueous polymer (A) and the aqueous polyester resin (C) is 100 wt %), wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)], is 65 to 420 mol %.

In this embodiment, the oxazoline group-containing aqueous polymer (A) and the aqueous polyester resin (C) are essential polymer components, and other polymer components such as other resins are used in combination as needed.

In the oxazoline group-containing aqueous polymer (A), which is an essential polymer component, the content of the oxazoline group is 6.0 to 9.0 mmol/g, preferably 6.5 to 8.5 mmol/g, more preferably 7.0 to 8.0 mmol/g.

The oxazoline group-containing aqueous polymer (A) is incorporated in an amount of 5 to 55 wt %, preferably 10 to 50 wt %, more preferably 15 to 45 wt %, most preferably 25 to 40 wt % (the total amount of the oxazoline group-containing aqueous polymer (A) and the aqueous polyester resin (C) is 100 wt %).

If the oxazoline group-containing aqueous polymer (A) is incorporated in an amount of less than 5 wt %, the crosslinking by an oxazoline group tends to be insufficient, and if the amount exceeds 55 wt %, a layer formed from a cured product of the gas barrier resin composition tends to have insufficient hot water resistance and solvent resistance. By controlling the amount within the range described above, a gas barrier composite film using a layer of a cured product of the gas barrier resin composition can have more stabilized gas barrier properties after hot water treatment.

On the other hand, in the aqueous polyester resin (C), the carboxyl group content is 0.5 to 2.0 mmol/g, more preferably 0.7 to 1.8 mmol/g, still more preferably 0.8 to 1.6 mmol/g, further preferably 1.0 to 1.4 mmol/g.

By controlling the content within the range described above, a gas barrier composite film using a layer of a cured product of the gas barrier resin composition can have more stabilized gas barrier properties after hot water treatment.

In particular, as described later, in a composite film having a base material layer, a layer of a cured product of the gas barrier resin composition and an inorganic thin film layer in this order, when the inorganic thin film layer is a layer containing a metal, its oxide, nitride, oxynitride, fluorinated compound or the like of Group 4B elements, e.g., silicon, of the periodic table, the carboxyl group content in the aqueous polyester resin (C) is preferably 0.7 to 1.8 mmol/g, more preferably 0.8 to 1.6 mmol/g, most preferably 1.0 to 1.4 mmol/g.

On the other hand, as described later, in a composite film having a base material layer, a layer of a cured product of the gas barrier resin composition and an inorganic thin film layer in this order, when the inorganic thin film layer is a layer containing a metal, its oxide, nitride, fluorinated compound or the like of Group 2A elements, transition elements, Group 2B elements or Group 3B elements of the periodic table, the carboxyl group content in the aqueous polyester resin (C) is preferably 0.8 to 1.6 mmol/g, more preferably 1.0 to 1.4 mmol/g.

The aqueous polyester resin (C) is incorporated in an amount of 95 to 45 wt %, preferably 90 to 50 wt %, more preferably 90 to 60 wt %, still more preferably 90 to 70 wt % (the total amount of the oxazoline group-containing aqueous polymer (A) and the aqueous polyester resin (C) is 100 wt %).

By controlling the amount within the range described above, a gas barrier composite film using a layer of a cured product of the gas barrier resin composition can have more stabilized gas barrier properties after hot water treatment.

In the gas barrier resin composition according to the embodiment (ii), the ratio of the mole number of the oxazoline group to the mole number of the carboxyl group [ratio of the mole number of the oxazoline group (x mmol) to the mole number of the carboxyl group (y mmol), which is indicated as (x/y)×100 (mol %)] is 65 to 420 mol %, preferably 68 to 300 mol %, more preferably 70 to 250 mol %.

In particular, as described later, in a composite film having a base material layer, a layer of a cured product of the gas barrier resin composition and an inorganic thin film layer in this order, when the inorganic thin film layer is a layer containing a metal, its oxide, nitride, oxynitride, fluorinated compound or the like of Group 4B elements, e.g., silicon, of the periodic table, the mole number ratio is preferably 70 to 250 mol %.

On the other hand, as described later, in a composite film having a base material layer, a layer of a cured product of the gas barrier resin composition and an inorganic thin film layer in this order, when the inorganic thin film layer is a layer containing a metal, its oxide, nitride, fluorinated compound or the like of Group 2A elements, transition elements, Group 2B elements or Group 3B elements of the periodic table, the mole number ratio is preferably 70 to 250 mol %.

Gas Barrier Resin Composition (System Requiring Three Polymer Components)

Embodiment (iii)

According to an embodiment (iii) of the gas barrier resin composition of the present invention, the composition comprises 10 to 55 wt % of an oxazoline group-containing aqueous polymer (A) containing 6.0 to 9.0 mmol/g of an oxazoline group, 10 to 80 wt % of an aqueous acrylic resin (B) containing 0.5 to 3.5 mmol/g of a carboxyl group, and 10 to 80 wt % of an aqueous polyester resin (C) containing 0.5 to 2.0 mmol/g of a carboxyl group (the total amount of the oxazoline group-containing aqueous polymer (A), the aqueous acrylic resin (B) and the aqueous polyester resin (C) is 100 wt %), wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)] is 150 to 420 mol %.

In the embodiment (iii), the oxazoline group-containing aqueous polymer (A), the aqueous acrylic resin (B), and the aqueous polyester resin (C) are essential polymer components, and other polymer components such as other resins may be used in combination as needed.

In the oxazoline group-containing aqueous polymer (A), the content of the oxazoline group is 6.0 to 9.0 mmol/g, preferably 6.5 to 8.5 mmol/g, more preferably 7.0 to 8.0 mmol/g.

By controlling the content within the range described above, a gas barrier composite film using a layer of a cured product of the gas barrier resin composition can have more stabilized gas barrier properties after hot water treatment.

The oxazoline group-containing aqueous polymer (A) is incorporated in an amount of 10 to 55 wt %, preferably 15 to 55 wt %, more preferably 18 to 55 wt % (the total amount of the oxazoline group-containing aqueous polymer (A), the aqueous acrylic resin (B) and the aqueous polyester resin (C) is 100 wt %).

In particular, as described later, in a composite film having a base material layer, a layer of a cured product of the gas barrier resin composition and an inorganic thin film layer in this order, when the inorganic thin film layer is a layer containing a metal, its oxide, nitride, oxynitride, fluorinated compound or the like of Group 4B elements, e.g., silicon, of the periodic table, the oxazoline group-containing aqueous polymer (A) is incorporated preferably in an amount of 15 to 50 wt %, particularly preferably 18 to 50 wt %, further preferably 20 to 45 wt %.

On the other hand, as described later, in a composite film having a base material layer, a layer of a cured product of the gas barrier resin composition and an inorganic thin film layer in this order, when the inorganic thin film layer is a layer containing a metal, its oxide, nitride, fluorinated compound or the like of Group 2A elements, transition elements, Group 2B elements, Group 3B elements of the periodic table, the oxazoline group-containing aqueous polymer (A) is incorporated preferably in an amount of 15 to 50 wt %, particularly preferably 20 to 45 wt %.

If the oxazoline group content in the oxazoline group-containing aqueous polymer (A) is less than 6.0 mmol/g, or if the oxazoline group-containing aqueous polymer (A) is incorporated in an amount of less than 10 wt %, the crosslinking by an oxazoline group tends to be insufficient, and if the oxazoline group content exceeds 9.0 mmol/g or the amount exceeds 55 wt %, a large amount of unreacted oxazoline group remains, and the hot water resistance and solvent resistance are insufficient.

By controlling the content and amount within the ranges described above, a gas barrier composite film using a layer of a cured product of the gas barrier resin composition can have more stabilized gas barrier properties after hot water treatment.

On the other hand, in the aqueous acrylic resin (B), the carboxyl group content is 0.5 to 3.5 mmol/g, more preferably 0.8 to 3.5 mmol/g, still more preferably 1.0 to 3.0 mmol/g, further preferably 1.5 to 3.0 mmol/g, most preferably 2.0 to 3.0 mmol/g.

In particular, as described later, in a composite film having a base material layer, a layer of a cured product of the gas barrier resin composition and an inorganic thin film layer in this order, when the inorganic thin film layer is a layer containing a Group 4B element metal, e.g., silicon, of the periodic table, its oxide, nitride, oxynitride or fluorinated compound, the carboxyl group content in the aqueous acrylic resin (B) is preferably 0.5 to 3.5 mmol/g.

On the other hand, as described later, in a composite film having a base material layer, a layer of a cured product of the gas barrier resin composition and an inorganic thin film layer in this order, when the inorganic thin film layer is a layer containing of a metal, its oxide, nitride, fluorinated compound or the like of Group 2A elements, transition elements, Group 2B elements or Group 3B elements of the periodic table, the carboxyl group content in the aqueous acrylic resin (B) is preferably 1.5 to 3.5 mmol/g, more preferably 2.0 to 3.0 mmol/g.

By controlling the content within the range described above, a gas barrier composite film using a layer of a cured product of the gas barrier resin composition can have more stabilized gas barrier properties after hot water treatment.

The aqueous acrylic resin (B) is incorporated in an amount of 10 to 80 wt %, preferably 20 to 80 wt %, more preferably 10 to 70 wt %, still more preferably 10 to 65 wt %, most preferably 15 to 65 wt % (the total amount of the oxazoline group-containing aqueous polymer (A), the aqueous acrylic resin (B) and the aqueous polyester resin (C) is 100 wt %).

If the aqueous acrylic resin (B) is incorporated in an amount of less than 10 wt %, water resistance and solvent resistance tends not to be fully achieved. If the amount exceeds 80 wt %, the adhesion of the barrier layer tends to be poor.

By controlling the amount within the range described above, a gas barrier composite film using a layer of a cured product of the gas barrier resin composition can have more stabilized gas barrier properties after hot water treatment.

In the aqueous polyester resin (C), the carboxyl group content is 0.5 to 2.0 mmol/g, preferably 0.7 to 1.8 mmol/g, more preferably 0.8 to 1.6 mmol/g, still more preferably 1.0 to 1.5 mol/g, most preferably 1.0 to 1.4 mmol/g.

By controlling the content within the range described above, a gas barrier composite film using a layer of a cured product of the gas barrier resin composition can have more stabilized gas barrier properties after hot water treatment.

The aqueous polyester resin (C) is incorporated in an amount of 10 to 80 wt %, preferably 10 to 70 wt %, more preferably 15 to 70 wt %, still more preferably 15 to 65 wt % (the total amount of the oxazoline group-containing aqueous polymer (A), the aqueous acrylic resin (B) and the aqueous polyester resin (C) is 100 wt %).

If the amount is less than 10 wt %, a barrier layer such as an inorganic thin film layer, together with a layer of the cured product, tends to be peeled off. If the amount exceeds 80 wt %, the water resistance tends to be poor.

By controlling the amount within the range described above, a gas barrier composite film using a layer of a cured product of the gas barrier resin composition can have more stabilized gas barrier properties after hot water treatment.

In the gas barrier resin composition according to the embodiment (iii) (system requiring three polymer components), the ratio of the mole number of the oxazoline group to the mole number of the carboxyl group [the mole number of the oxazoline group (x mmol) to the mole number of the carboxyl group (y mmol), which is indicated as $(x/y) \times 100$ (mol %)] is 100 to 420 mol %, preferably 150 to 420 mol %, particularly preferably 130 to 420 mol %, further preferably 165 to 420 mol %.

In particular, as described later, in a composite film having a base material layer, a layer of a cured product of the gas barrier resin composition and an inorganic thin film layer in this order, when the inorganic thin film layer is a layer containing a metal, its oxide, nitride, oxynitride, fluorinated compound or the like of Group 4B elements, e.g., silicon, of the periodic table, the mole number ratio is 150 to 300 mol %, preferably 160 to 280 mol %, more preferably 170 to 260 mol %.

On the other hand, as described later, in a composite film having a base material layer, a layer of a cured product of the gas barrier resin composition and an inorganic thin film layer in this order, when the inorganic thin film layer is a layer containing a metal, its oxide, nitride, fluorinated compound or the like of Group 2A elements, transition elements, Group 2B elements, Group 3B elements of the periodic table, the mole number ratio is preferably 150 to 420 mol %, particularly preferably 160 to 420 mol %, further preferably 170 to 420 mol %.

Oxazoline Group-Containing Aqueous Polymer (A)

The oxazoline group-containing aqueous polymer (A) is a polymer obtainable by polymerizing an addition-polymerizable oxazoline group-containing monomer, or polymerizing this monomer with other monomers. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These may be used singly, or a mixture of two or more kinds thereof may be used. Among these, 2-isopropenyl-2-oxazoline is preferred.

The other monomer is not limited as long as being a monomer copolymerizable with the addition-polymerizable oxazoline group-containing monomer. Examples thereof include acrylic acid or methacrylic acid, or its esters such as alkylacrylates and alkylmethacrylates (examples of the alkyl group include methyl group, ethyl group, n-propyl group, isopropyl group, n-butyl group and isobutyl group); unsaturated carboxylic acids such as acrylic acid, methacrylic acid, itaconic acid, maleic acid, fumaric acid, crotonic acid, styrenesulfonic acid and salts thereof (e.g., sodium salts, potassium salts, ammonium salts and tertiary amine salts); unsaturated nitriles such as acrylonitrile and methacrylonitrile; unsaturated amides such as acrylamide, methacrylamide, N-alkylacrylamide, N-alkylmethadrylamide, N,N-dialkylacrylamide, and N,N-dialkylmethacrylate (examples of the alkyl group include methyl group, ethyl group, n-propyl group, isopropyl group, n-butyl group, isobutyl group and cyclohexyl group); vinyl esters such as vinyl acetate, vinyl propionate and a compound formed by adding a polyalkylene oxide to acrylate or methacrylate; vinyl ethers such as methyl vinyl ether and ethylvinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methylstyrene. These monomers may be used singly, or two or more kinds thereof may be used.

Aqueous Acrylic Resin (B)

The aqueous acrylic resin (B) is a resin containing an alkyl acrylate and/or an alkyl methacrylate as a main component. Specifically, the aqueous acrylic resin (B) is a water-soluble or water-dispersible resin containing the alkyl acrylate and/or alkyl methacrylate component usually in an amount of 40 to 95 mol %, and a copolymerizable functional group-having vinyl monomer component usually in an amount of 5 to 60 mol %.

Examples of a preferred functional group in the vinyl monomer include carboxyl group, acid anhydride group, sulfonic acid group, salts thereof, amide group, alkylolated amide group, amino group (including substituted amino group), alkylolated amino group or salts thereof, hydroxyl group or epoxy group. In particular, carboxyl group, acid anhydride group or epoxy group are preferred. Two or more kinds of these groups may be contained in the resin.

By allowing the aqueous acrylic resin (B) to contain the alkyl acrylate and/or alkyl methacrylate in an amount of 40 mol % or more, particularly satisfactory coatability, strength of coating films and antiblocking property are achieved. By allowing the alkyl acrylate and/or alkyl methacrylate to be contained in an amount of not more than 95 mol % and introducing, as a copolymer component, a compound having a specific functional group in an amount of 5 mol % or more to the aqueous acrylic resin, the resin (B) can be easily water-soluble or water-dispersible, and this state can be stabilized for a long period of time. As a result thereof, the improvements are achieved in terms of the adhesion between the layer of the cured product and a base material layer, particularly a polyester film layer, and in terms of the strength, water resistance and chemical resistance of the layer of the cured product formed by the reaction in the layer of the cured product.

Examples of an alkyl group of the alkyl acrylate and alkyl methacrylate include methyl group, n-propyl group, isopropyl group, n-butyl group, isobutyl group, 2-ethyhexyl group, lauryl group, stearyl group and cyclohexyl group. Examples of compounds having a carboxyl group, an acid anhydride or the like include acrylic acid, methacrylic acid, itaconic acid, maleic acid, and their alkali metal salts, alkali earth metal salts and ammonium salts, and further include anhydrides such as maleic anhydride. Examples of compounds having a sulfonic acid or a salt thereof include vinylsulfonic acid, styrenesulfonic acid, metal salts, e.g., sodium salts, of these sulfonic acids, and ammonium salts of these sulfonic acids.

Examples of compounds having an amide group or an alkylolated amide group include acrylamide, methacrylamide, N-methylmethacrylamide, methylolated acrylamide, and methylolated methacrylamide.

Examples of compounds having an amino group, an alkylolated amino group or a salt thereof include diethylamino ethyl vinyl ether, 2-amino ethyl vinyl ether, 3-amino propyl vinyl ether, 2-amino butyl vinyl ether, and dimethyl amino ethyl methacrylate.

Examples of compounds having a hydroxyl group include β-hydroxyethyl acrylate, β-hydroxyethyl methacrylate, β-hydroxypropyl acrylate, β-hydroxypropyl methacrylate, β-hydroxy vinyl ether, 5-hydroxypentyl vinyl ether, 6-hydroxyhexyl vinyl ether, polyethylene glycol monoacrylate, polyethylene glycol monomethacrylate, and polypropylene glycol monoacrylate. Examples of compounds having an epoxy group include glycidyl acrylate and glycidyl methacrylate.

Further examples of compounds that may be used in combination include acrylonitrile, styrenes, butyl vinyl ether, maleic acid mono- or di-alkylester, fumaric acid mono- or di-alkylester, itaconic acid mono- or di-alkylester, vinyl acetate, vinylpyridine, vinylpyrrolidone, and vinyltrimethoxysilane.

The aqueous acrylic resin (B) may be any type of the acrylic resins described above, but preferred are acrylic resins free from emulsifying agents, because by the absence of the emulsifying agents, the water resistance of the oxazoline group-containing aqueous polymer (A) is not inhibited.

Thus, the aqueous acrylic resin (B) may be a self-dispersion type aqueous acrylic resin synthesized by using a reactive emulsifying agent, or an aqueous acrylic resin synthesized by using a high molecular weight surfactant. This is because the water resistance of the oxazoline group-containing aqueous polymer (A) is not inhibited by the emulsifying agent reacted or by the high molecular weight surfactant.

The aqueous acrylic resin (B) prevents the decrease of water resistance and solvent resistance of the oxazoline group-containing aqueous polymer (A). The reason why these properties are prevented from decreasing is considered as follows. A film of an acrylic resin prevents an oligomer from being precipitated on a surface of polyethylene terephthalate. This oligomer-precipitation prevention effect inhibits moisture infiltrating into a defective barrier layer formed by oligomer lump from attacking a coated layer, namely a base material layer. Thus, the aqueous acrylic resin is believed to allow the oxazoline group-containing aqueous polymer (A) to fully exhibit its water resistance and solvent resistance.

Aqueous Polyester Resin (C)

The gas barrier resin compositions of the present invention include the embodiment (ii) or (iii), which contains the aqueous polyester resin (C) other than the oxazoline group-containing aqueous polymer (A) and the aqueous acrylic resin (B). The aqueous polyester resin (C) is not particularly limited, but preferably may be an aqueous or water-dispersible saturated or unsaturated polyester which does not contain a low-molecular hydrophilic dispersing agent and the like.

Examples of a dicarboxylic acid component of the saturated polyester include aromatic dicarboxylic acids such as terephthalic acid, isophthalic acid and 2,5-naphthalenedicarboxylic acid; aliphatic dicarboxylic acids such as adipic acid, azelaic acid and sebacic acid; oxycarboxylic acids such as oxybenzoic acid and ester-forming derivatives thereof. Examples of a glycol component include aliphatic glycols such as ethylene glycol, 1,4-butanedoil, diethylene glycol and triethylene glycol; alicyclic glycols such as 1,4-cyclohexanedimethanol; aromatic diols such as p-xylenediol; and poly(oxyalkylene) glycols such as polyethylene glycol, polypropylene glycol and polytetramethylene glycol.

The saturated polyesters described above have a linear structure, but the aqueous polyester resin (C) may be a branched polyester formed by using a trivalent or more ester-forming component. On the other hand, examples of the unsaturated polyester mentioned above are the following (1) and (2).

(1) unsaturated polyesters obtained by a method in which a raw material component having a copolymerizable unsaturated group is allowed to react with another raw material component to form a resin, the resin having a copolymerizable unsaturated group in its skeleton, as known in e.g., JP-B-S45-22011, JP-B-S44-7134, JP-A-S48-78233 and JP-A-S50-58123.

(2) unsaturated polyesters obtained by a method in which a saturated polyester not having a copolymerizable unsaturated group is obtained, and this saturated polyester undergoes the addition of a vinyl-based monomer having a vinyl group and a functional group reactive with a functional group such as a hydroxyl group or a carboxyl group present in the saturated polyester, as known in e.g., JP-B-49-47916 and JP-B-S50-6223.

Examples of the vinyl-based monomer include compounds having an epoxy group and a vinyl group, such as glycidyl methacrylate; compounds having an alkoxysilanol group and a vinyl group, such as vinylmethoxysilane and methacryloxyethyltrimethoxysilane; compounds having an acid anhydride group, e.g., maleic anhydride, tetrahydrophthalic anhydride, and a vinyl group; and compounds having an isocyanate group and a vinyl group; such as 2-hydroxypropyl methacrylate-hexamethylene diisocyanate adduct.

The aqueous polyester resin (C), in order to have increased affinity with an aqueous medium, preferably has a carboxyl group. A carboxyl group can be easily introduced to side chains of a saturated or unsaturated polyester, for example, by a method for allowing a carboxyl group-having dioxane compound to react with a polyester (JP-A-61-228030); a method for radically grafting an unsaturated carboxylic acid to a polyester (JP-A-62-225510); a method for allowing a polyester to react with a halogenoacetic acid to introduce a substituent to an aromatic ring (JP-A-62-225527); and a method for allowing a polyester to react with a polyvalent carboxylic acid anhydride compound (JP-A-62-240318).

The carboxyl group of the aqueous polyester resin (C) may have counter ions. Examples of the counter ions generally include monovalent ions, and preferably include hydrogen ions or amine-based onium ions including ammonium ions.

Cured Product of Gas Barrier Resin Composition

The gas barrier resin composition of the present invention, by being cured, is employable for various applications using its excellent gas barrier properties.

A general method is, for example, that the gas barrier resin composition, with e.g., an isocyanate-based curing agent incorporated thereto, is heated to evaporate and remove water content, in which case a known equipment such as an oven is employable.

The cured product of the gas barrier resin composition of the present invention has functions of improved gas barrier properties, and is employable for various applications. In particular, a composite film having a base material layer, the layer of the cured product of the gas barrier resin composition and an inorganic thin film layer in this order has excellent gas barrier properties with respect to oxygen, water vapor, carbon dioxide gas and the like and has transparency.

The composite film having gas barrier properties is described hereinafter.

Base Material Layer

The base material layer used for the composite film according to another embodiment of the present invention is not particularly limited. Examples thereof are materials in the form of a sheet or a film including polyolefins (e.g., polyethylene, polypropylene), polyesters (e.g., polyethylene terephthalate, polybutylene terephthalate, polyethylene naphthalate), polyamides (e.g., nylon-6, nylon-66), polyvinyl chloride, polyimide, polyvinyl acetate, polyacrylonitrile, polycarbonate, polystyrene, ionomers, cellophane, polyvinyl alcohol, or copolymers thereof. Unstretched or stretched films of such polymer materials capable of film formation may be generally used. Further films that may be used are composite films obtained when any of the above films is coated with a synthetic resin, a barrier material, an antistatic agent or the like. The base material layer is appropriately selected from the materials described above depending on applications.

A film serving as the base material layer (hereinafter, also referred to as the "base material film") can be formed by common film formation method such as melt molding method e.g., T-die method and inflation method, and a casting method using solution. The base material film may be unstretched, or may be monoaxially or biaxially stretched. A stretching method that may be adopted is a common stretching method, such as tenter stretching, tubular stretching, roll stretching, rolling and belt stretching, or stretching combining any of these methods.

The thickness of the base material film is not particularly limited, and is selected appropriately in view of packaging suitability, mechanical strength, plasticity and the like, but is usually about 3 micrometers ($\mu$m) to 200 micrometers ($\mu$m), preferably about 5 micrometers ($\mu$m) to 100 micrometers ($\mu$m).

To a resin material used for the base material film, a known additive is appropriately added, such as an antistatic agent, an ultraviolet absorbent, a plasticizer, a lubricant and a colorant.

Layer Formed from Cured Product of Gas Barrier Resin Composition

In the present invention, the layer formed from a cured product of the gas barrier resin composition can be formed by heating and curing the gas barrier resin composition. For heating and curing the gas barrier resin composition, a common method is a heating method to evaporate and remove moisture, and a known equipment such as an oven can be used.

The layer formed from a cured product of the gas barrier resin composition preferably has a thickness of 0.01 micrometer (μm) to 3.0 micrometers (μm), more preferably 0.01 micrometer (μm) to 1.0 micrometer (μm), most preferably 0.01 micrometer (μm) to 0.1 micrometer (μm). In the above ranges, gas barrier properties are good and economic efficiency is ensured.

A coating method for forming the layer formed from a cured product of the gas barrier resin composition is not particularly limited. A common method may be adopted, such as gravure coating, reverse coating, roll coating, bar coating, spray coating or air knife coating, and these methods may be appropriately combined. A further example is in-line coating, in which coating is performed during the production of the base material film.

Thermal Treatment

The layer formed from the cured product, by being thermally treated, can have more improved gas barrier properties after hot water treatment. It is desirable that the thermal treatment is performed usually at 60 to 280° C., preferably 100 to 250° C., more preferably 150 to 230° C., and the thermal treatment may be performed in any of air atmosphere and inert gas atmosphere. The pressure is not particularly limited, and may be any of increased pressure, reduced pressure and ordinary pressure. The formation of the inorganic thin film layer may be preceded by or followed by the thermal treatment. Heating treatment time is usually about 1 second to 60 minutes, preferably 2 seconds to 45 minutes, particularly preferably 3 seconds to 30 minutes.

Inorganic Thin Film Layer

On the surface of the base material layer, via the layer formed from the cured product of the gas barrier resin composition, an inorganic thin film layer is formed.

It is preferable in terms of gas barrier properties that the inorganic thin film layer is composed of at least one component selected from one or more metals, metal oxides, metal nitrides, metal oxynitrides, metal fluorinated compounds of Group 4B of the periodic table, metals, metal oxides, metal nitrides, metal fluorides of Group 2A elements, transition elements, Group 2B elements and Group 3B elements of the periodic table, and composites formed from two or more of these compounds.

Examples of the Group 4B metals constituting the inorganic thin film layer include silicon, germanium and tin. Of these, in particular, silicon is preferred. These metals may be provided singly as the inorganic thin film layer. These metals may be provided as metal oxides, metal nitrides or metal fluorides, or may be provided as composites formed by using these metal compounds. In terms of gas barrier properties, any one of silicon oxide, silicon nitride and silicon oxynitride, or a composite formed from any of these is preferable.

Examples of the Group 2A metals constituting the inorganic thin film layer include beryllium, magnesium, calcium, strontium, and barium. Examples of the transition metals include titanium, zirconium, ruthenium, hafnium and tantalum. Examples of the Group 3B metals include aluminum, gallium, indium and thallium.

Among the metals constituting the inorganic thin film layer, silicon, aluminum, titanium, zirconium or magnesium are preferred. These metals may be provided singly as the inorganic thin film layer. These metals may be provided as metal oxides, metal nitrides or metal fluorides, or may be provided as composites formed by using two or more of these metal compounds. Of these, in terms of gas barrier properties, aluminum or aluminum oxide is preferred.

The inorganic thin film layer is formed by vacuum process including vacuum deposition, sputtering, ion plating or chemical vapor deposition (CVD method).

The thickness of the inorganic thin film layer varies depending on applications, and is preferably 0.001 micrometer (μm) to 0.5 micrometer (μm), more preferably 0.001 micrometer (μm) to 0.2 micrometer (μm). The above range is effective in terms of continuousness of thin films, unlikeliness of the occurrence of cracking and plasticity.

The gas barrier composite film of the present invention, depending on the shape of the base material layer and on applications, can take various forms including a laminate film, a laminate sheet, a tray, a cup and a hollow article (bottle).

The gas barrier composite film obtained in the present invention, by laminating a fusion-bonded layer on at least one surface of the composite film, can be formed into a multilayer film suitable as a heat-sealable packaging film. The fusion-bonded layer is a layer obtained usually as a fusion-bonded layer from known monomers or copolymers of α-olefins such as ethylene, propylene, butene-1, hexene-1,4-methyl•pentene-1 and octene-1; polyolefins such as high-pressure low-density polyethylene, linear low-density polyethylene (LLDPE), high-density polyethylene, polypropylene, polypropylene random copolymer, polybutene, poly(4-methyl•pentene-1), low crystalline or amorphous ethylene•propylene random copolymer, ethylene•butene1random copolymer, propylene•butene-1random copolymer, and compositions formed from two or more kinds of the polyolefins; ethylene•vinyl acetate copolymer (EVA), ethylene•(meth)acrylic acid copolymer or metal salts thereof; and compositions of EVA and polyolefins.

In particular, the fusion-bonded layer obtained from an ethylene-based polymer such as high-pressure low-density polyethylene, linear low-density polyethylene (LLDPE), high density polyethylene is preferred, since these materials ensure excellent low-temperature heat sealability and heat seal strength.

Other layers such as these fusion-bonded layers can be laminated, via or not via an adhesive such as a urethane-based adhesive and an ester-based adhesive, can be laminated on one surface of the composite film, for example on the inorganic thin film layer side, by various methods such as dry laminating and extrusion laminating.

EXAMPLES

The present invention is specifically described with reference to Examples, but the present invention is not limited by these Examples as long as not deviating from its gist.

In Examples and Comparative Examples, properties and the like were determined by the following evaluation methods.

<Evaluation Method>

(1) Preparation of Multilayer Film

On one surface of a linear low-density polyethylene film having a thickness of 50 micrometers (μm) (manufactured by Mitsui Chemicals Tohcello, Inc. product name: T.U.X FCS), 12 parts by weight of a urethane-based adhesive (polyurethane-based adhesive (manufactured by Mitsui Chemicals Polyurethanes, Inc., product name: TAKELAC A310), 1 part by weight of an isocyanate-based curing agent (manufactured by Mitsui Chemicals Polyurethanes, Inc., product name: TAKENATE A3) and 7 parts by weight of ethyl acetate were applied and dried. The resultant film was laminated (dry laminating) with the inorganic thin film layer side of a gas barrier composite film obtained in any of Examples and Comparative Examples. A multilayer film (a) was thus obtained.

On one surface of an unstretched polypropylene film having a thickness of 70 micrometers (μm) (manufactured by Mitsui Chemicals Tohcello, Inc.; product name: RXC21), 9 parts by weight of an ester-based adhesive (polyester-based adhesive (manufactured by Mitsui Chemicals Polyurethanes, Inc.; product name: TAKELAC A525), 1 part by weight of an isocyanate-based curing agent (manufactured by Mitsui Chemicals Polyurethanes, Inc. product name: TAKENATE A52) and 7.5 parts by weight of ethyl acetate were applied and dried. The resultant film was laminated (dry laminating) with the inorganic thin film layer side of a gas barrier composite film obtained in any of Examples and Comparative Examples. A multilayer film (b) was thus obtained.

(2) Retort Treatment:

The multilayer film (b), which had been laminated with the unstretched polypropylene film, obtained in the above method, was folded such that the unstretched polypropylene film was positioned inward. Then, two sides of the film were heat-sealed to form a bag. Thereto, 40 cc of water was put as a content, and the other side of the film was heat-sealed, to prepare a bag (bag with its three sides sealed). This was retort-treated in a high-temperature/high pressure retort sterilization instrument at 135° C. for 30 minutes. After retort treatment, the content water was removed, so that a multilayer film (b) after retort treatment was obtained.

(3) Oxygen Transmission Rate ($O_2TR$) [ml/($m^2$·day·MPa)]:

The oxygen transmission rate of the multilayer film obtained by the above method was measured by using OX-TRAN2/21 ML manufactured by MOCON, in accordance with JIS K 7126, at a temperature of 20° C. and at a humidity of 80% R.H.

Regarding the multilayer film (a), the oxygen transmission rate before retort treatment, i.e., initial oxygen transmission rate, was measured by the above measurement method. Regarding the multilayer film (b) after retort treatment, the oxygen transmission rate was measured in the same manner.

In other words, for the oxygen transmission rate ($O_2TR$) before retort treatment ("initial" indicated in Table), the multilayer film (a) was used, and for the oxygen transmission rate ($O_2TR$) after retort treatment ("135° C." or "after retort treatment" indicated in Table), the multilayer film (b) was used. This is based on the fact that before retort treatment, the oxygen transmission rate ($O_2TR$) of the multilayer film (a) is the same as the oxygen transmission rate ($O_2TR$) of the multilayer film (b).

(4) Water Vapor Transmission Rate (WVTR) [g/($m^2$·day)]:

The multilayer film was folded such that the linear low-density polyethylene film side was positioned inward, and two sides thereof were heat-sealed to form a bag. Thereto, calcium chloride was put as a content, and the other side was heat-sealed, to prepare a bag (bag with its three sides sealed) such that the surface area was 0.01 $m^2$. This was left under conditions of 40° C. and 90% R.H. for three days. Based on difference in weight, the water vapor transmission rate was measured.

Regarding the multilayer film (a), the water vapor transmission rate before retort treatment, i.e., initial water vapor transmission rate, was measured by the above measurement method. Regarding the multilayer film (b) after retort treatment, the water vapor transmission rate was measured in the same manner.

In other words, for the water vapor transmission rate (WVTR) before retort treatment ("initial" indicated in Table, the multilayer film (a) was used, and for the water vapor transmission rate after retort treatment ("135° C." or "after retort treatment" indicated in Table), the multilayer film (b) was used. This is based on the fact that before retort treatment, the water vapor transmission rate (WVTR) of the multilayer film (a) is the same as the water vapor transmission rate (WVTR) of the multilayer film (b).

Examples 1 to 13 and Comparative Examples 1 to 10

A corona-treated surface of a base material composed of a biaxially-stretched polyethylene terephthalate having a thickness of 12 micrometers (μm) was coated with 0.06 micrometer (μm) of an aqueous medium coating liquid containing any of the components indicated below, the aqueous medium coating liquid containing resins for forming a cured product layer each at a proportion shown in Table 1 or 2 described later, and the aqueous medium coating liquid was dried at 120° C. for 1 minute. Then, on the coated surface, a silicon oxide layer was provided as an inorganic thin film layer having a thickness of 20 nanometers (nm) (0.02 μm) by vacuum deposition, to obtain a gas barrier composite film. Further, the gas barrier composite film was thermally treated in an oven under conditions of 120° C. for 30 minutes.

The resultant gas barrier composite film was evaluated in the manner described above. Results thereof are set forth in Tables 1 and 2.

Resin A-1:

As the oxazoline group-containing aqueous polymer (A), an aqueous coating agent "EPOCROS WS-300", containing 7.7 mmol/g of an oxazoline group, manufactured by Nippon Shokubai Co., Ltd., was used.

Resin A-2:

As the oxazoline group-containing aqueous polymer (A), an aqueous coating agent "EPOCROS WS-500", containing 4.5 mmol/g of an oxazoline group, manufactured by Nippon Shokubai Co., Ltd., was used.

Resin B-1:

As the aqueous acrylic resin (B), "JURYMER ET-410", containing 0.9 mmol/g of a carboxyl group, manufactured by TOAGOSEI, Co., Ltd., was used.

Resin B-2:

As the aqueous acrylic resin (B), an aqueous acrylic resin aqueous coating material obtained by the following method was used.

That is, a mixture of 30 parts by weight of ethyl acrylate, 50 parts by weight of methyl methacrylate and 20 parts by weight of methacrylic acid was solution-polymerized in isopropyl alcohol. After the polymerization, the resultant solution was heated with the addition of water to remove isopropyl alcohol. The resultant product was adjusted by using ammonia water so as to have pH of 8.5. As a result, an aqueous acrylic resin (B) containing 2.7 mmol/g of a carboxyl group was obtained.

Resin B-3:

As the aqueous acrylic resin (B), "JURYMER FC-80" manufactured by TOAGOSEI, Co., Ltd., containing 0.4 mmol/g of a carboxyl group, was used.

Resin C:

As the aqueous polyester resin (C), "Polyester WR-961", containing 1.2 mmol/g of a carboxyl group, manufactured by Nippon Synthetic Chemical Industry Co., Ltd., was used.

The ratio of "the mole number of an oxazoline group to the mole number of a carboxyl group [the ratio of the mole number of the oxazoline group (x mmol) to the mole number of the carboxyl group (y mmol), (x/y)×100 (mol %)"] is indicated in Tables 1 and 2 as "Amount of oxazoline group/Amount of carboxyl group amount".

Examples 14 to 17 and Comparative Examples 11 to 24

The same operation was performed as in Example 1, except that an aqueous medium coating liquid was applied in an amount of 0.03 micrometer (μm), and dried at 120° C. for 1 minute, and then on the coated surface, aluminum oxide was provided as an inorganic thin film layer serving as an inorganic thin film layer having a thickness of 9 nanometers (nm) (0.009 μm) by vacuum deposition method.

Evaluation results are set forth in Table 3.

TABLE 1

| | Amount of Oxazoline group/Amount of Carboxyl group (mol %) | Incorporation Proportion (wt %) | | | | WVTR [g/(m² · day)] | | O₂TR [ml/(m² · day · MPa] | |
|---|---|---|---|---|---|---|---|---|---|
| | | Resin A-1 | Resin B-1 | Resin B-2 | Resin C | Initial | 135° C. | Initial | 135° C. |
| Example 1 | 253 | 22 | 78 | — | — | 0.3 | 0.6 | 5 | 8 |
| Example 2 | 126 | 12 | 88 | — | — | 0.5 | 0.4 | 6 | 7 |
| Example 3 | 173 | 38 | — | 62 | — | 0.5 | 1.1 | 6 | 18 |
| Example 4 | 253 | 47 | — | 53 | — | 0.6 | 0.9 | 6 | 12 |
| Example 5 | 74 | 10 | — | — | 90 | 0.6 | 0.9 | 4 | 8 |
| Example 6 | 221 | 24 | — | — | 76 | 0.3 | 0.5 | 2 | 9 |
| Comp. Ex. 1 | 46 | 14 | — | 86 | — | 0.6 | 2.6 | 10 | 65 |
| Comp. Ex. 2 | 89 | 24 | — | 76 | — | 0.5 | 2.4 | 8 | 52 |

TABLE 2

| | Amount of Oxazoline group/Amount of Carboxyl group (mol %) | Incorporation Proportion (wt %) | | | | | | WVTR [g/(m² · day)] | | O₂TR [ml/(m² · day · MPa] | |
|---|---|---|---|---|---|---|---|---|---|---|---|
| | | Resin A-1 | Resin A-2 | Resin B-1 | Resin B-2 | Resin B-3 | Resin C | Initial | 135° C. | Initial | 135° C. |
| Example 7 | 254 | 24 | — | 57 | — | — | 19 | 0.5 | 0.5 | 8 | 7 |
| Example 8 | 191 | 19 | — | 62 | — | — | 19 | 0.5 | 0.6 | 9 | 10 |
| Example 9 | 253 | 25 | — | 38 | — | — | 38 | 0.3 | 0.3 | 6 | 7 |
| Example 10 | 197 | 21 | — | 40 | — | — | 40 | 0.2 | 0.6 | 6 | 17 |
| Example 11 | 254 | 42 | — | — | 39 | — | 19 | 0.5 | 0.7 | 6 | 11 |
| Example 12 | 172 | 34 | — | — | 48 | — | 19 | 0.4 | 1.1 | 6 | 16 |
| Example 13 | 221 | 24 | — | 15 | — | — | 61 | 0.3 | 0.4 | 3 | 7 |
| Comp. Ex. 3 | 141 | 16 | — | 42 | — | — | 42 | 0.2 | 3.1 | 5 | 178 |
| Comp. Ex. 4 | 140 | 15 | — | 67 | — | — | 19 | 0.5 | 2.9 | 9 | 23 |
| Comp. Ex. 5 | 87 | 10 | — | 72 | — | — | 19 | 0.6 | 4.8 | 11 | 271 |
| Comp. Ex. 6 | 88 | 21 | — | — | 60 | — | 19 | 0.5 | 1.7 | 6 | 31 |
| Comp. Ex. 7 | 46 | 13 | — | — | 69 | — | 19 | 0.6 | 2.5 | 7 | 70 |
| Comp. Ex. 8 | 141 | 12 | — | — | — | 44 | 44 | 0.2 | 4.5 | 14 | 357 |
| Comp. Ex. 9 | 141 | — | 20 | — | — | 40 | 40 | 0.3 | 4.7 | 58 | 248 |
| Comp. Ex. 10 | 78 | 10 | — | 18 | — | — | 72 | 0.5 | 5.0 | 5 | 411 |

TABLE 3

| | Amount of Oxazoline group/Amount of Carboxyl group (mol %) | Incorporation Proportion (wt %) | | | | | Water Vapor Transmission Rate (WVTR) [g/(m² · day)] | | Oxygen Transmission Rate (O₂TR) [ml/(m² · day · MPa] | |
|---|---|---|---|---|---|---|---|---|---|---|
| | | Resin A-1 | Resin B-1 | Resin B-2 | Resin B-3 | Resin C | Initial | After Retort Treatment | Initial | After Retort Treatment |
| Example 14 | 418 | 53 | — | 28 | — | 19 | 0.7 | 1.4 | 6 | 8 |
| Example 15 | 333 | 48 | — | 33 | — | 19 | 0.6 | 1.3 | 8 | 8 |
| Example 16 | 254 | 42 | — | 39 | — | 19 | 0.5 | 1.0 | 6 | 18 |
| Example 17 | 172 | 34 | — | 48 | — | 19 | 0.5 | 1.2 | 6 | 13 |
| Comp. Ex. 11 | 88 | 21 | — | 60 | — | 19 | 0.6 | 1.5 | 7 | 106 |
| Comp. Ex. 12 | 46 | 13 | — | 69 | — | 19 | 0.6 | 2.2 | 20 | 563 |
| Comp. Ex. 13 | 505 | 57 | — | 24 | — | 19 | 0.7 | 3.8 | 6 | 29 |
| Comp. Ex. 14 | 44 | 5 | 76 | — | — | 19 | 0.4 | 4.9 | 5 | 427 |
| Comp. Ex. 15 | 134 | 14 | 67 | — | — | 19 | 0.4 | 1.7 | 6 | 100 |
| Comp. Ex. 16 | 513 | 39 | 42 | — | — | 19 | 0.6 | 4.9 | 4 | 378 |
| Comp. Ex. 17 | 728 | 48 | 33 | — | — | 19 | 0.7 | 5.4 | 4 | 230 |
| Comp. Ex. 18 | 1023 | 57 | 24 | — | — | 19 | 0.9 | 2.6 | 4 | 1700 |
| Comp. Ex. 19 | 46 | 3 | — | — | 78 | 19 | 2.1 | 4.9 | 6 | 1150 |
| Comp. Ex. 20 | 145 | 9 | — | — | 72 | 19 | 2.8 | 4.5 | 4 | 768 |

TABLE 3-continued

| | Amount of Oxazoline group/Amount of Carboxyl group (mol %) | Incorporation Proportion (wt %) | | | | | Water Vapor Transmission Rate (WVTR) [g/(m²·day)] | | Oxygen Transmission Rate (O₂TR) [ml/(m²·day·MPa)] | |
|---|---|---|---|---|---|---|---|---|---|---|
| | | Resin A-1 | Resin B-1 | Resin B-2 | Resin B-3 | Resin C | Initial | After Retort Treatment | Initial | After Retort Treatment |
| Comp. Ex. 21 | 253 | 15 | — | — | 66 | 19 | 1.1 | 4.1 | 6 | 378 |
| Comp. Ex. 22 | 503 | 27 | — | — | 54 | 19 | 0.6 | 4.6 | 6 | 236 |
| Comp. Ex. 23 | 1093 | 48 | — | — | 33 | 19 | 1.0 | 3.4 | 4 | 1250 |
| Comp. Ex. 24 | 1434 | 57 | — | — | 24 | 19 | 1.1 | 5.1 | 5 | 1380 |

INDUSTRIAL APPLICABILITY

The gas barrier resin composition of the present invention gives a cured product from which a layer excellent in gas barrier properties is obtained, and is applicable in various uses. In particular, a gas barrier composite film obtained by providing the layer formed from the cured product of the gas barrier resin composition between a base material layer and an inorganic thin film layer is excellent in gas barrier properties even after hot water treatment, particularly after retort treatment. The gas barrier resin composition of the present invention, by taking advantage of its characteristics, are applicable suitably for packaging materials, particularly food packaging materials of contents that require high gas barrier properties, and other various packaging materials including medical uses and industrial uses.

Furthermore, the gas barrier composite film of the present invention is applicable as a gas barrier film for elements such as liquid crystal display elements and organic ELs and surface light emitting substances, photo devices and solar cells.

The invention claimed is:

1. A gas barrier resin composition consisting essentially of 5 to 55 wt % of an oxazoline group-containing aqueous polymer (A) containing 6.0 to 9.0 mmol/g of an oxazoline group, and 95 to 45 wt % of an aqueous acrylic resin (B) containing 0.5 to 3.5 mmol/g of a carboxyl group, wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)], is 100 to 420 mol %, and
wherein the weight percentages of the oxazoline group-containing aqueous polymer (A) and the aqueous acrylic resin (B) total 100 wt % and are based on the total weight of the oxazoline group-containing aqueous polymer (A) and the aqueous acrylic resin (B).

2. A gas barrier resin composition comprising 5 to 55 wt % of an oxazoline group-containing aqueous polymer (A) containing 6.0 to 9.0 mmol/g of an oxazoline group, and 95 to 45 wt % of an aqueous polyester resin (C) containing 0.5 to 2.0 mmol/g of a carboxyl group, wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)], is 65 to 420 mol %, and
wherein the weight percentages of the oxazoline group-containing aqueous polymer (A) and the aqueous polyester resin (C) total 100 wt % and are based on the total weight of the oxazoline group-containing aqueous polymer (A) and the aqueous polyester resin (C).

3. A gas barrier resin composition consisting essentially of 10 to 55 wt % of an oxazoline group-containing aqueous polymer (A) containing 6.0 to 9.0 mmol/g of an oxazoline group, 10 to 80 wt % of an aqueous acrylic resin (B) containing 0.5 to 3.5 mmol/g of a carboxyl group, and 10 to 80 wt % of an aqueous polyester resin (C) containing 0.5 to 2.0 mmol/g of a carboxyl group (the total amount of the oxazoline group-containing aqueous polymer (A), the aqueous acrylic resin (B) and the aqueous polyester resin (C) is 100 wt %), wherein the ratio of the mole number of the oxazoline group to the mole number of the carboxyl group [the ratio of the mole number of the oxazoline group (x mmol) to the mole number of the carboxyl group (y mmol), which is indicated as (x/y)×100 (mol %)] is 150 to 420 mol %, and
wherein the weight percentages of the oxazoline group-containing aqueous polymer (A), the aqueous acrylic resin (B) and the aqueous polyester resin (C) total 100 wt % and are based on the total weight of the oxazoline group-containing aqueous polymer (A), the aqueous acrylic resin (B) and the aqueous polyester resin (C).

4. A gas barrier composite film comprising a base material layer, a layer formed from a cured product of the gas barrier resin composition according to claim 1 and an inorganic thin film layer in this order.

5. A gas barrier composite film in which on at least one surface of a base material layer, an inorganic thin film layer is provided via a layer of a cured product of the gas barrier resin composition according to claim 1, wherein the inorganic thin film layer is composed of one or more metals, metal oxides, metal nitrides, metal oxynitrides or metal fluorides of Group 4B elements of the periodic table, one or more metals, metal oxides, metal nitrides or metal fluorides of Group 2A elements, transition elements, Group 2B elements or Group 3B elements of the periodic table, or composites formed from two or more of the compounds.

6. The gas barrier composite film according to claim 4, wherein a metal constituting the inorganic thin film layer is silicon, aluminum, titanium, zirconium or magnesium.

* * * * *